US005777607A

United States Patent [19]

Koolen

[11] Patent Number: 5,777,607
[45] Date of Patent: Jul. 7, 1998

[54] LOW-COST RESISTIVE TABLET WITH TOUCH AND STYLUS FUNCTIONALITY

[75] Inventor: Gerardus J. K. M. Koolen, Eindhoven, Netherlands

[73] Assignee: U.S. Philips Corporation, New York, N.Y.

[21] Appl. No.: 602,547

[22] Filed: Feb. 20, 1996

[30] Foreign Application Priority Data

Feb. 22, 1995 [EP] European Pat. Off. ............... 95200433

[51] Int. Cl.$^6$ ........................................... G06F 3/02
[52] U.S. Cl. ........................................... 345/174; 345/179
[58] Field of Search .................................... 345/174, 179; 178/18, 19, 20

[56] References Cited

U.S. PATENT DOCUMENTS 5,231,381  7/1993  Duwaer.
5,365,461  11/1994  Stein et al..

FOREIGN PATENT DOCUMENTS 9424648  10/1994  WIPO.

Primary Examiner—Jeffery Brier

[57] ABSTRACT

A data entry device with a resistive layer enables a user to enter data both by finger and stylus. The stylus is electrically connected to the device. An AC driver drives the layer with a time-varying voltage for capacitive finger detection. A DC driver drives the layer with a substantially constant voltage for resistive stylus detection. The AC driver is disabled when the capacitance of the stylus relative to ground is increased due to the user's hand holding the stylus.

6 Claims, 1 Drawing Sheet

LOW-COST RESISTIVE TABLET WITH TOUCH AND STYLUS FUNCTIONALITY

BACKGROUND OF THE INVENTION

1. Field of the Invention

The invention relates to a data processing system with a data input device for enabling a user to enter data into the system both by touching the device and by manipulating a stylus in the proximity of the device. The stylus is electrically connected to the device. The device comprises a resistive layer and an AC driver for driving the layer with a time-varying voltage to enable capacitive detection of the user's touch.

2. Background Art

Graphical user-interfaces have become widespread in the field of data input devices as highly suitable means to communicate with a data processing system. Examples of graphical user-interfaces are touch screens and graphical tablets that enable a user to selectively enter data into the system by touching a screen at predetermined locations and by manipulating a stylus contacting the surface of the tablet, respectively. US Pat. No. 5,231,381 (PHN 13.100) discloses an attractive example, wherein a touch screen and a graphical tablet are combined with an LCD forming a multiple-purpose graphical user-interface device.

U.S. Pat. No. 5,365,461 discloses a position sensing computer input device as specified in the preamble. The touch is sensed by supplying the layer with a time-varying voltage. Current detectors detect the resulting current that is capacitively coupled to ground via the user. The stylus is sensed by supplying the stylus with a time-varying voltage and measuring the resulting currents in the layer. Discrimination between touch and stylus is achieved by determining which one of the layer and the stylus is being driven. However, resting the hand on the layer while manipulating the stylus interferes with the signal transmission from the stylus. This problem is resolved to some extent in software by subtracting the resolved hand position from the perceived stylus position to resolve the true stylus position.

OBJECT OF THE INVENTION

It is, inter alia, an object of the invention to provide a system with a simple, low-cost data input device for multiple-purpose data entry that is more accurate than that of the known resistive layer input device discussed above.

SUMMARY OF THE INVENTION

To this end, the invention provides a system as specified in the preamble, characterized in that the input device comprises a DC driver for driving the layer with a substantially constant voltage to enable resistive detection of the stylus.

In the invention, the touch is sensed capacitively using time-varying voltage drive, and the stylus is sensed resistively using constant voltage drive. The inventor has recognized that there is no interference from the capacitance, formed by the hand resting on the layer, with the DC currents of the stylus detection mechanism so that accuracy is not adversely affected. Note that therefore, in contrast with the known resistive layer input device, an accurate and truly concurrent detection of finger and stylus is feasible. Preferably, the resistive layer comprises antimony-tin-oxide (ATO). Such a layer has proven to be highly scratch-resistant. Thus, a simple, accurate, low-cost and rugged user-interface is provided for multi-purpose use.

The input device is preferably provided with disabling means to selectively disable the AC driver upon detection of the stylus. This prevents data from being entered inadvertently through the capacitive coupling between the layer and the user's hand. Note that this inadvertent data generation is essentially different from the signal interference occurring in the prior art input device. Having data available from both touch and stylus in the invention may result in undesired data entry, but does not affect accuracy as the sensing techniques are different. In the prior art input device, the sensing techniques are essentially the same as far as physical interaction with the layer is concerned.

Detection of the stylus can be achieved in a variety of manners.

A first manner is to use capacitive detection of the user holding the stylus. To this end, a time-dependent voltage with high frequency components, e.g., a step function voltage or a high-frequency harmonic voltage, is temporarily supplied to the stylus or a constant-current source is temporarily connected to the stylus. The capacitor formed by the user holding the stylus conducts the high-frequency components. The response is measured at some node in the circuit in terms of the voltage as a function of time. A certain slope and level in the response is then interpreted as the stylus being actuated, i.e., being held by the user, so that the hand detection should be disabled. Basically, this method is a capacitance measurement. The response may be made more pronounced by varying the voltage of the resistive layer while supplying the stylus with a time-dependent voltage having high-frequency components. The capacitive coupling between the layer and the user triggers then a corresponding variation in the voltage representative of the capacitive coupling between the user and the stylus.

A second manner is to drive the stylus temporarily with a time-dependent voltage having high-frequency components in order to measure the capacitive coupling between the stylus and the layer. The capacitance could again be derived from measuring the temporal characteristics of a voltage at some node in the circuit to decide on the presence of the stylus. The response may again be made more pronounced by varying the voltage of the layer while supplying the voltage with high-frequency components to the stylus. Then, the capacitive coupling between the layer and the user triggers a jump in the measured voltage.

A third manner is to supply the layer with a voltage having specific temporal characteristics that are picked up by the stylus when being held in the vicinity of the layer or when contacting the layer. The pick-up is interpreted as the stylus being active so that the AC driver can be disabled to prevent hand detection.

BRIEF DESCRIPTION OF THE DRAWING

The invention is explained below in further detail and by way of example with reference to the accompanying drawing, wherein.

Throughout the drawing like reference symbols indicate corresponding or similar features.

DETAILED DESCRIPTION OF THE PREFERRED EMBODIMENTS

System

Figure 1:
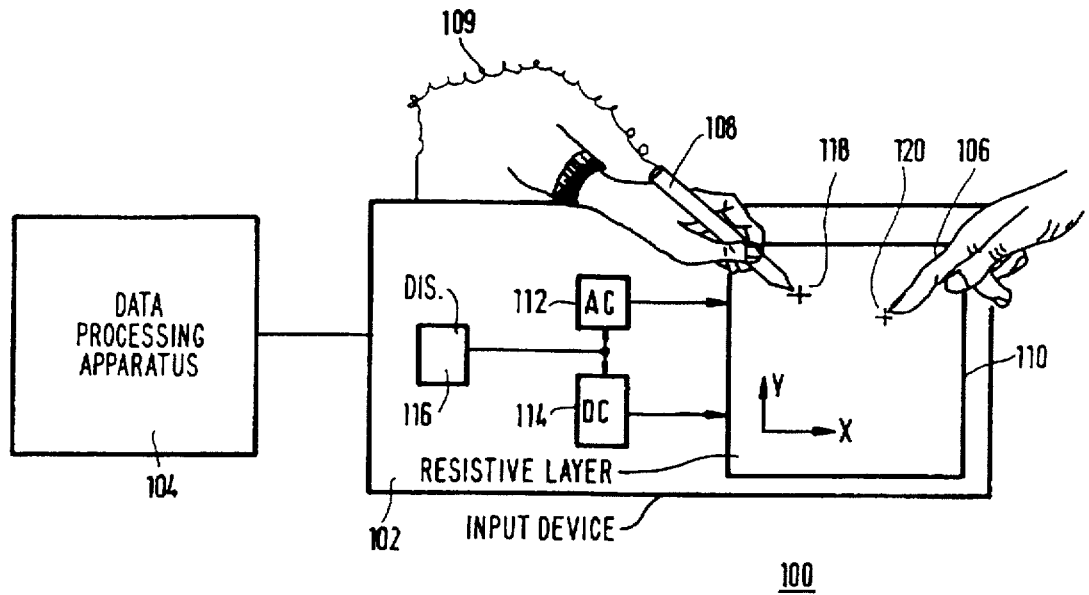
FIG. 1 is a diagram of the system of the invention.

FIG. 1 is a diagram of a system 100 of the invention, comprising a data input device 102 for entering data into system 100, and a data processing apparatus 104, such as a PC, connected to device 102. Device 102 enables a user to enter data into system 100 both by touching device 102 with a finger 106 and by manipulating a stylus 108. Stylus 108 is electrically connected to device 102 via lead 109. Device 102 comprises a tablet with a resistive layer 110, preferably of antimony-tin-oxide (ATO), an AC driver 112 is provided for driving layer 110 with a time-varying voltage to enable capacitive detection of finger 106. A DC driver 114 is provided for driving layer with a substantially constant voltage to enable resistive detection of stylus 106. Disabling means 116 is provided for control of AC driver 112 to disable hand detection upon detection of stylus 108.

In the finger detection mode, layer 110 is driven by AC driver 112 to give layer 110 a voltage that varies with time. For example, identical sources supplying time-varying voltages are connected to the corners of layer 110. Electrically, finger 106 represents a capacitive coupling to ground so that a current flows from layer 110 to ground via a point of contact 120. Each respective one of the sources provides a respective contribution to this current depending on the effective resistance of the portion of layer 110 between the respective source and point of contact 120. Multiple current measurements thus enable to calculate the ratios of these contributions for determining the position of point 120. The calculation is preferably done after the measured values have been converted into digital signals. In the stylus detection mode, layer 110 is driven by DC driver 114 so as to alternately establish substantially time-independent voltage gradients in the X-direction and the Y-direction. The voltages at a point of contact 118 with stylus 108 are representative of the coordinates of point 118 relative to layer 110. Stylus 108 functions as a probe to measure the voltage at point 118. The small voltage is measured and converted into a digital signal for further processing. The invention thus functionally combines finger and stylus detection in one apparatus using a single resistive layer.

Circuit

Above system 100 enables concurrent detection of finger 106 and stylus 108. When the user rests his hand on tablet 110, the capacitive detection of the hand may erroneously be interpreted as input of data. Therefore, finger detection is preferably switched off when data is entered through stylus 108. To this end, input device 102 is provided with disabling means 116 that is operative to disable AC driver 112 and, therefore, hand detection. This is explained with reference to FIG. 2.

Figure 2:
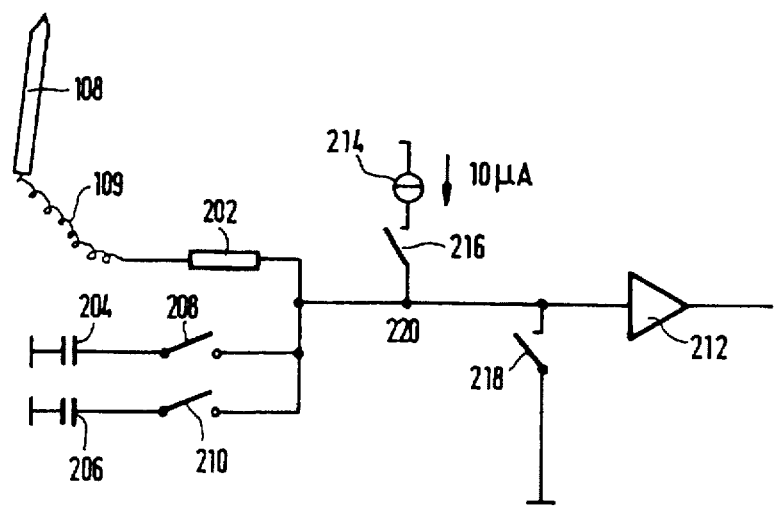
FIG. 2 is a diagram of an electrical circuit for use in the system of the invention.

FIG. 2 is a diagram of an electrical circuit 200 for use in input device 102. Circuit 200 processes data entered via stylus 108 and also checks if hand detection should be disabled. Circuit 200 comprises a resistor 202 of, e.g., 1k ohm electrically connected to stylus 108. Stylus 108 and its lead 109 each have a resistance less than, say, 10k ohm. Resistor 202 sets a lower limit to the effective resistance of the contact between stylus 108 and layer 110, as the actual contact resistance between stylus 108 and layer 110 may vary widely, e.g., between 1 ohm and 100k ohm. This variation is partly due to the roughness or greasiness of the contacting surfaces. Circuit 200 further has capacitors 204 and 206 connected to resistor 202 via switches 208 and 210, respectively. Switches 208 and 210 may each have an on-resistance of, e.g., 1k ohm. Switches 208 and 210 are operated alternately and in synchronism with enabling of DC driver 114 to allow accumulation of charge on capacitors 204 and 206. The charge is representative of the X and Y coordinates of point of contact 118 between stylus 108 and layer 110. The charge thus accumulated gives rise to a voltage across the relevant one of capacitors 204 and 206. This voltage is fed to an amplifier 212 that in turn supplies an analog value to, e.g., an A/D converter (not shown) for data transfer to a microcontroller (not shown).

Circuit 200 further includes a current source 214 of, e.g., 10 μA, a switch 216 for coupling source 214 to stylus 108, and a switch 218 to discharge stylus 108. If switches 208, 210 and 218 are turned off and switch 216 is turned on, source 214 starts driving stylus 108. Stylus 108 itself represents a small capacitance towards ground. If the user holds stylus 108 in his hand, the capacitance experienced by source 214 is much larger. The voltage at node 220 then increases more slowly than when the user does not hold stylus 108. The slope and the level of the voltage at node 220 is measured by the microcontroller (not shown) connected to the output of amplifier 212. This voltage may be boosted by driving the voltage of layer 110 during these measurements. The microcontroller thereupon decides on the basis of the data received whether or not the hand detection should be disabled. Switch 218 is used to discharge stylus 108 when stylus input data measurements are initiated. Note that use of current source 214 represents a manner to build a stylus detection system less expensive than the other ways discussed above.

What is claimed is:

1. A data processing system with a data input device for enabling a user to enter data into the system both by touching the device and by manipulating a stylus in the proximity of the device, wherein the device comprises a resistive layer and an AC driver for driving the layer with a time-varying voltage to enable capacitive detection of the user's touch, wherein the stylus is electrically connected to the device, wherein the device comprises a DC driver for driving the layer with a substantially constant voltage to enable resistive detection of the stylus; and wherein the system comprises disabling means to selectively disable the AC driver upon detection of the user intending to use the stylus to enter the data.

2. The system of claim 1, wherein the disabling means comprises measuring means operative to measure a capacitance of the stylus with respect to a point of reference and comprising a constant-current source for selectively charging the stylus and discharging means for selectively discharging the stylus.

3. The system of claim 2, wherein the measuring means comprises driving means to create a time-dependent voltage at the layer so as to change a voltage across the capacitance.

4. For use in a data processing system, a data input device for enabling a user to enter data into the system both by touching the device and by manipulating a stylus in the proximity of the device, wherein:

the device comprises a resistive layer and an AC driver for driving the layer with a time-varying voltage to enable capacitive detection of the user's touch;

the stylus is electrically connected to the device;

the device comprises a DC driver for driving the layer with a substantially constant voltage to enable resistive detection of the stylus; and the device comprises disabling means to selectively disable the AC driver upon detection of the user intending to use the stylus to enter the data.

5. The device of claim 6, wherein the disabling means comprises measuring means operative to measure a capacitance of the stylus with respect to a point of reference and comprising a constant-current source for selectively charging the stylus and discharging means for selectively discharging the stylus.

6. The device of claim 5, wherein the measuring means comprises driving means to create a time-dependent voltage at the layer so as to change a voltage across the capacitance.

\* \* \* \* \*